(12) United States Patent
Kashyap

(10) Patent No.: US 9,178,907 B2
(45) Date of Patent: Nov. 3, 2015

(54) SYSTEM, METHOD AND COMPUTER PROGRAM PRODUCT FOR DETECTING ENCODED SHELLCODE IN NETWORK TRAFFIC

(75) Inventor: Rahul Chander Kashyap, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 2237 days.

(21) Appl. No.: 11/450,110

(22) Filed: Jun. 9, 2006

(65) Prior Publication Data

US 2013/0276118 A1    Oct. 17, 2013

(51) Int. Cl.
*H04L 29/06* (2006.01)

(52) U.S. Cl.
CPC .......... *H04L 63/145* (2013.01); *H04L 63/1416* (2013.01)

(58) Field of Classification Search
USPC ...................................................... 726/22–25
See application file for complete search history.

(56) References Cited

U.S. PATENT DOCUMENTS

| | | | |
|---|---|---|---|
| 5,557,742 A | 9/1996 | Smaha et al. | |
| 5,621,889 A | 4/1997 | Lermuzeaux et al. | |
| 5,769,942 A | 6/1998 | Maeda | |
| 5,798,706 A | 8/1998 | Kraemer et al. | |
| 5,805,801 A | 9/1998 | Holloway et al. | |
| 5,812,763 A | 9/1998 | Teng | |
| 5,864,683 A | 1/1999 | Boebert et al. | |
| 5,892,903 A | 4/1999 | Klaus | |
| 5,898,830 A | 4/1999 | Wesinger, Jr. et al. | |
| 5,905,859 A | 5/1999 | Holloway et al. | |
| 5,919,257 A | 7/1999 | Trostle | |
| 5,919,258 A | 7/1999 | Kayashima et al. | |
| 5,940,591 A | 8/1999 | Boyle et al. | |
| 6,052,788 A | 4/2000 | Wesinger, Jr. et al. | |
| 6,088,804 A | 7/2000 | Hill et al. | |
| 6,119,236 A | 9/2000 | Shipley | |
| 6,154,844 A | 11/2000 | Touboul et al. | |
| 6,178,509 B1 | 1/2001 | Nardone et al. | |
| 6,185,678 B1 | 2/2001 | Arbaugh et al. | |
| 6,185,689 B1 | 2/2001 | Todd, Sr. et al. | |
| 6,243,815 B1 | 6/2001 | Antur et al. | |
| 6,301,699 B1 | 10/2001 | Hollander et al. | |
| 6,513,122 B1 * | 1/2003 | Magdych et al. | 726/23 |
| 7,007,301 B2 | 2/2006 | Crosbie et al. | 726/23 |
| 7,409,717 B1 | 8/2008 | Szor | |
| 7,904,955 B1 | 3/2011 | Bu et al. | |
| 2006/0069912 A1 | 3/2006 | Zheng et al. | 713/151 |
| 2009/0070872 A1 * | 3/2009 | Cowings et al. | 726/23 |

OTHER PUBLICATIONS

U.S. Appl. No. 11/332,115, filed Jan. 12, 2006.
Giovanni Vigna, et al., "NetSTAT: A Network-Based Intrusion Detection System," Department of Computer Science, University of California Santa Barbara, pp. 1-46. Supported under Agreement No. F30602-97-1-0207, 1999.

(Continued)

*Primary Examiner* — Beemnet Dada
(74) *Attorney, Agent, or Firm* — Blank Rome, LLP

(57) ABSTRACT

A system, method and computer program product are provided for detecting encoded shellcode. In use, network traffic that is encoded is identified. Further, it is determined whether the network traffic that is encoded includes shellcode.

13 Claims, 5 Drawing Sheets

(56) References Cited

OTHER PUBLICATIONS

Y. F. Jou, et al., and S.F. Wu, et al., "Design and Implementation of a Scalable Intrusion Detection System for the Protection of Network Infrastructure," Advanced Networking Research, MCNC, RTP, NC, et al., pp. 15, 2000.
Ivan Krsul, "Computer Vulnerability Analysis Thesis Proposal," The Coast Laboratory, Department of Computer Sciences, Purdue University, IN, Technical Report CSD-TR-97-026. Apr. 15, 1997, pp. 1-23.
Matt Bishop, "Vulnerabilities Analysis," Department of Computer Science, University of California at Davis, pp. 1-12.
Matt Bishop, "A Taxonomy of UNIX System and Network Vulnerabilities," CSE-95-10, May 1995, pp. 17.
Matt Bishop, et al., "A Critical Analysis of Vulnerability Taxonomies," CSE-96-11, Sep. 1996, pp. 1-14.
Dawn X. Song, et al., "Advanced and Authenticated Marking Schemes for IP Traceback," Report No. UCB/CSD-00-1107, Computer Science Division (EECS), University of California, Berkeley, Jun. 2000, pp. 1-11.
Chien-Lung Wu, et al., IPSec/PHIL (Packet Header Information List): Design, Implementation, and Evaluation, NC State University, Raleigh, NC, et al., pp. 6, 2002.
Allison Mankin, et al., "On Design and Evaluation of "IntentionDriven" ICMP Traceback," USC/ISI, et al., pp. 7, 2002.
Brian Carrier, et al., "A Recursive Session Token Protocol for Use in Computer Forensic and TCP Traceback," CERIAS, Purdue University, West Lafayette, IN, et al., 2002 IEEE, pp. 7.
Stefan Savage, et al., "Practical Network Support for IP Traceback," Department of Computer Science and Engineering, University of Washington, Seattle, WA. Copyright 2000, pp. 12.
Diheng Qu, et al., "Statistical Anomaly Detection for Link-State Routing Protocols," Computer Science Department, North Carolina State University, Raleigh, NC, et al., Supported under Contract No. F30602-96-C-0325,pp. 9, 2002.
Office Action Summary from U.S. Appl. No. 11/332,115 mailed on Jul. 14, 2009.
Office Action Summary from U.S. Appl. No. 11/332,115 mailed on Jan. 28, 2010.
Office Action Summary from U.S. Appl. No. 11/332,115 mailed on May 18, 2010.
Office Action Summary from U.S. Appl. No. 11/332,115 mailed on May 16, 2011.
Office Action Summary from U.S. Appl. No. 10/172,138 mailed on Aug. 11, 2009.
Office Action Summary from U.S. Appl. No. 10/172,138 mailed on Jan. 25, 2010.
Office Action Summary from U.S. Appl. No. 10/172,138 mailed on May 21, 2010.
Notice of Allowance and Fee(s) Due from U.S. Appl. No. 10/172,138 mailed on Nov. 4, 2010.

* cited by examiner

SYSTEM, METHOD AND COMPUTER PROGRAM PRODUCT FOR DETECTING ENCODED SHELLCODE IN NETWORK TRAFFIC

FIELD OF THE INVENTION

The present invention relates to security applications, and more particularly to applications for identifying exploits in network traffic.

BACKGROUND

Increasingly, computer systems have needed to protect themselves against undesirable code. Such undesirable computer code has generally taken the form of viruses, worms, Trojan horses, spyware, adware, and so forth. The damage and/or inconvenience capable of being incurred by these types of undesirable code has ranged from mild interference with a program, such as the display of an unwanted political message in a dialog box, to the complete destruction of contents on a hard drive, and even the theft of personal information.

Propagators of such undesirable code have developed numerous modes of inflicting unwanted results. For example, shellcode is sometimes used for such purposes. Shellcode is an assembly language program which traditionally executes a shell on certain operating systems and may be used as an exploit payload, providing an attacker with access to a system.

Many mechanisms have been created in order to provide the much needed protection from such shellcode-related attacks. Examples of such mechanisms include intrusion detection/prevention systems, firewalls, etc. While these mechanisms are typically effective in terms of identifying patterns in network traffic that are indicative of shellcode-related attacks, such pattern matching techniques are complicated and inaccurate when the shellcode is encoded (e.g. utilizing UTF-8/16/32, HTML encoding, etc.). This is primarily the result of numerous permutation/combinations that need to be detected due to such encoding.

There is thus a need for overcoming these and/or other problems associated with the prior art.

SUMMARY

A system, method and computer program product are provided for detecting encoded shellcode. In use, network traffic that is encoded is identified. Further, it is determined whether the network traffic that is encoded includes shellcode.

DETAILED DESCRIPTION

Figure 1:
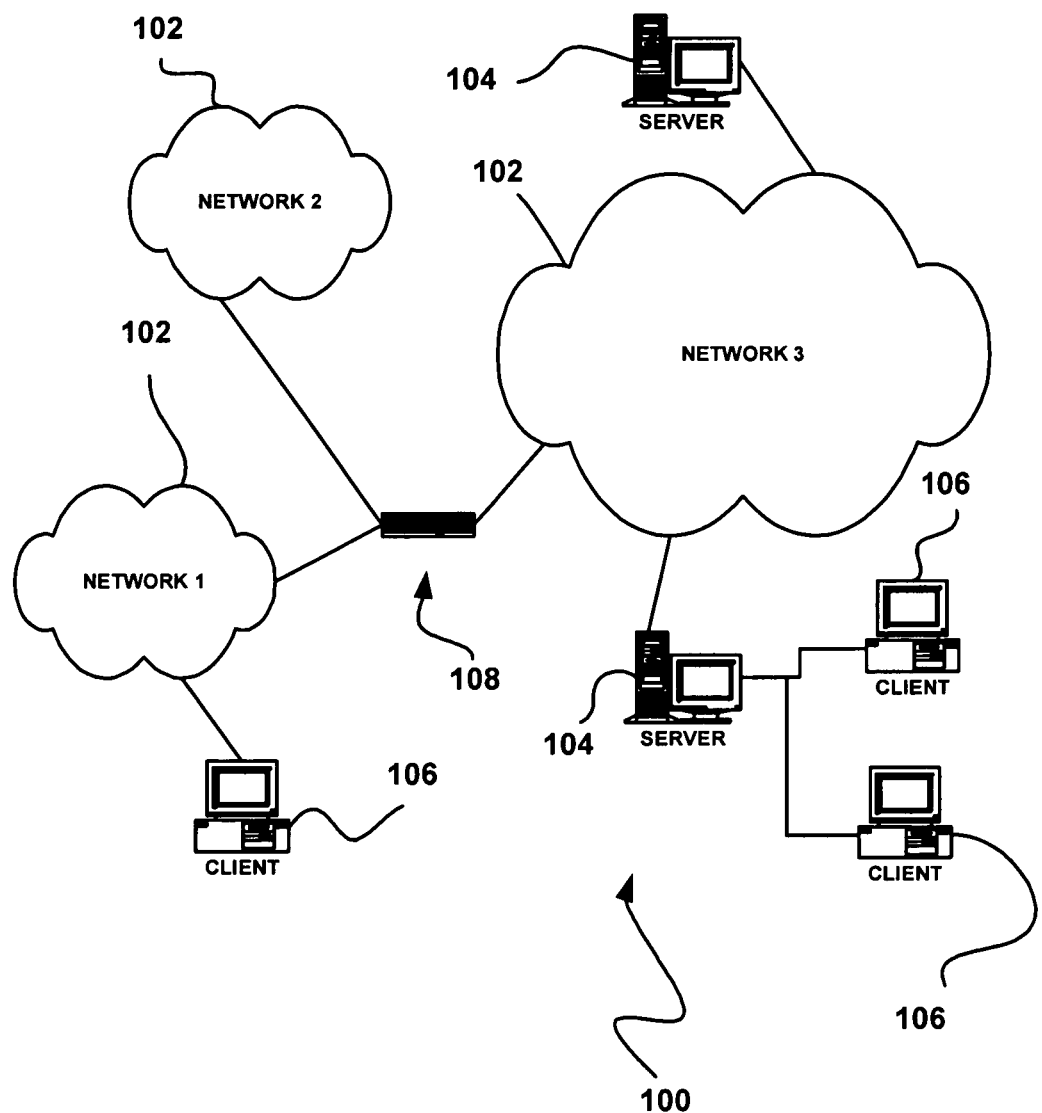
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
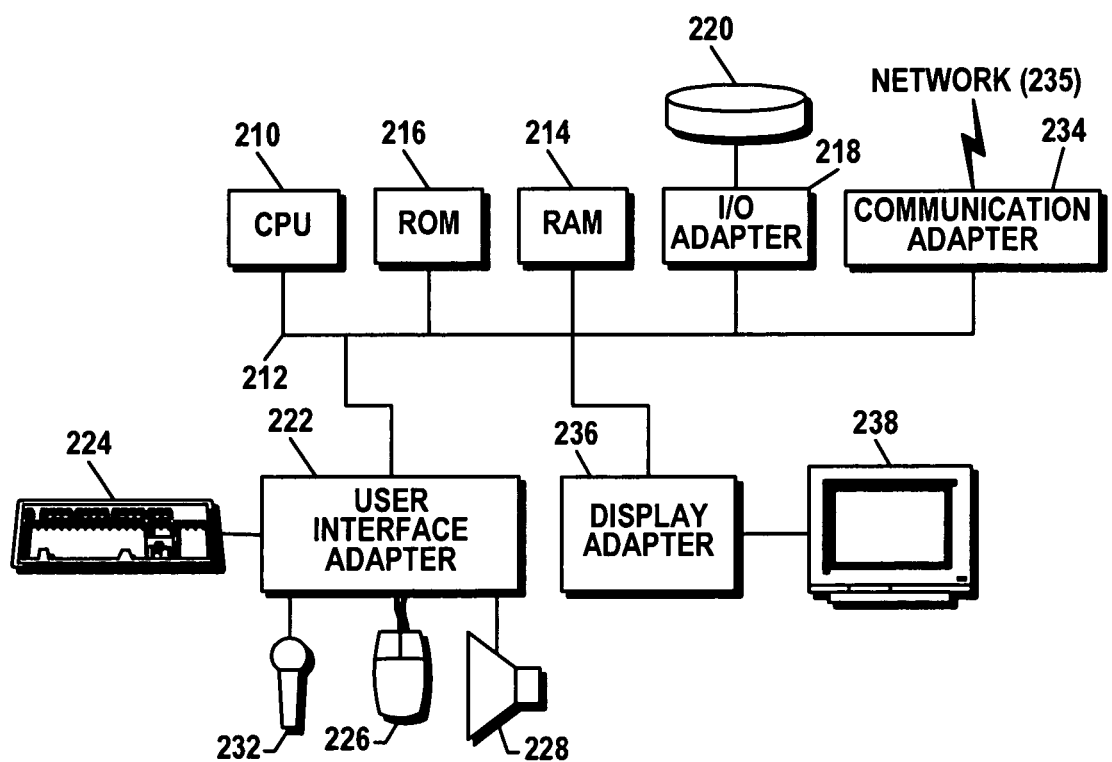
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
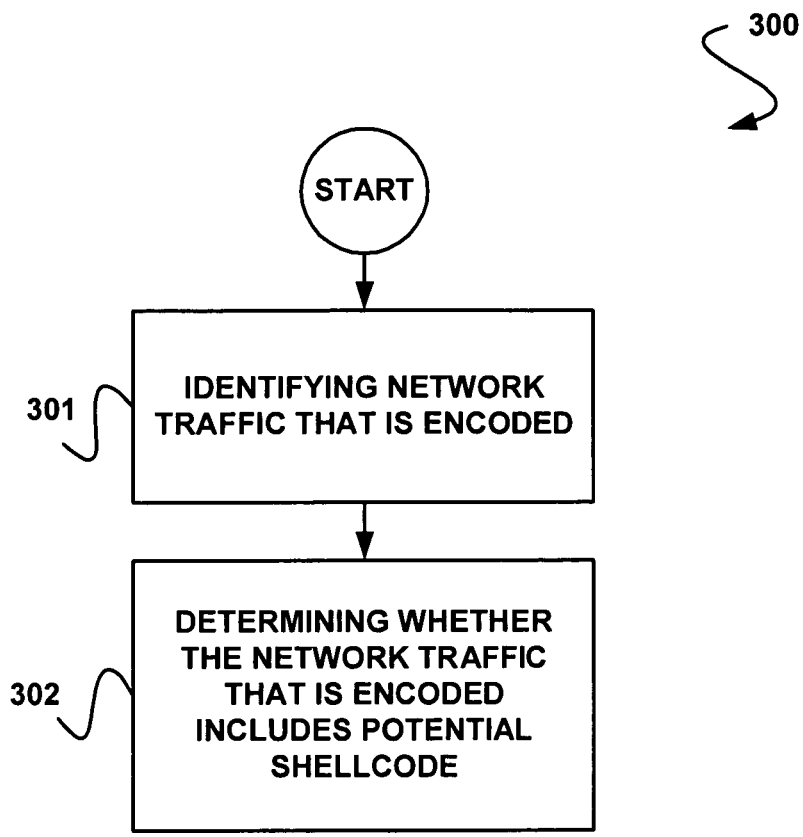
FIG. 3 shows a method for detecting encoded shellcode in network traffic, in accordance with one embodiment.

FIG. 3 shows a method for detecting encoded shellcode in network traffic, in accordance with one embodiment. As an option, the method 300 may be implemented in the context of the architecture and environment of FIGS. 1 and/or 2. Of course, however, the method 300 may be carried out in any desired environment.

As shown in operation 301, network traffic that is encoded is identified. The network traffic may include any type of data capable of being transmitted over a network. Just by way of example, in some embodiments, the network traffic may include one or more predetermined instructions indicative of shellcode (e.g. system calls, no operations, etc.). For example, the network traffic may include predetermined instructions performed by shellcode. In addition, the network traffic may be encoded utilizing any type of encoding. Just by way of example, the network traffic may be encoded utilizing Unicode Transformation Format (UTF), Hyper Text Markup Language Encoding (HTML Encoding), and/or any other encoding scheme capable of resulting in the network traffic being converted from a first format to a second format.

In addition, it is determined whether the network traffic that is encoded includes potential shellcode, as shown in operation 302. In the context of the present description, the shellcode may include any program capable of executing a shell (i.e. an outermost layer of a computer program, etc.). For example, as an option, the shellcode may be capable of executing a shell on an operating system, utilizing a machine language (e.g. assembly language, etc.). In various specific embodiments involving exemplary operating systems, such shell may include a 'Ibin/sh' UNIX shell, a cmd.exe shell (on a DOS or Microsoft Windows operating system), etc.

In one optional embodiment, it may be determined that the encoded network traffic includes potential shellcode based on a threshold. For instance, a number of instructions within the network traffic may be identified. Such instructions may include any type of instructions that are indicative of shellcode. Just by way of example, the instructions may include those mentioned hereinabove (e.g. system calls, etc.).

The number of instructions may then be compared to the threshold, such that if the threshold is exceeded, the network traffic is determined to include potential shellcode. Of course, it should be noted that any method of determining whether encoded network traffic includes potential shellcode may be utilized. In this way, shellcode, which may potentially be associated with undesirable code, may be identified.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
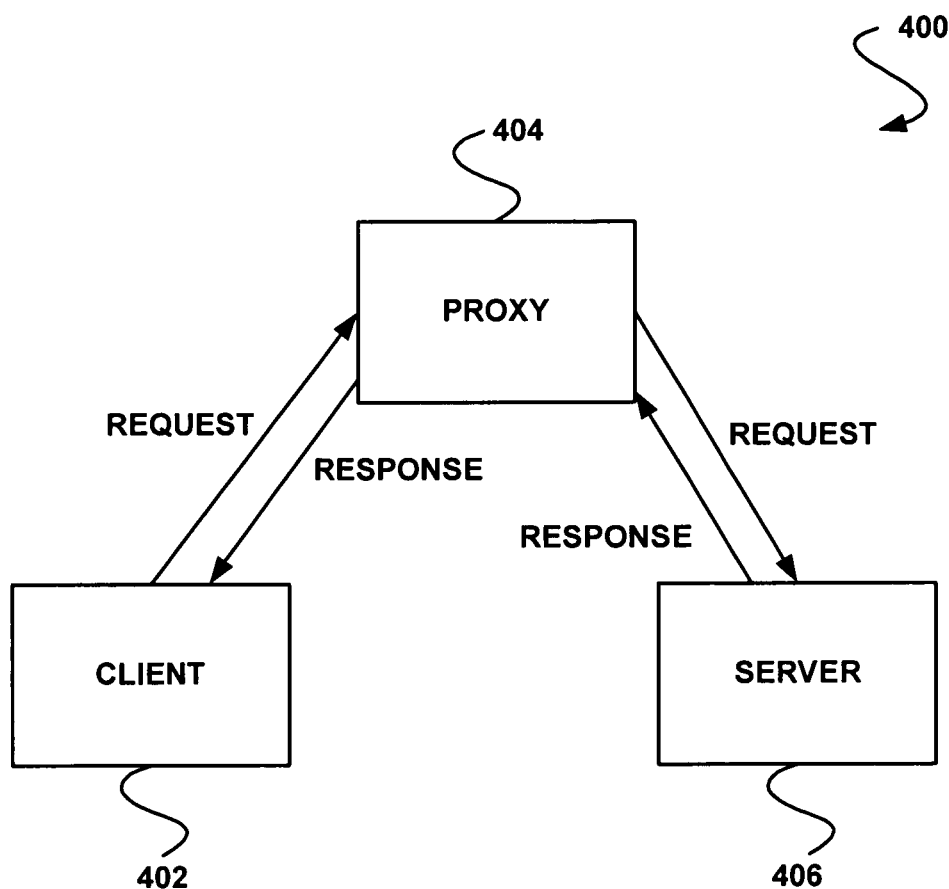
FIG. 4 shows a system for requesting a resource from a client to a server, in accordance with another embodiment.

FIG. 4 shows a system 400 for requesting a resource from a client to a server, in accordance with another embodiment. As an option, the system 400 may be implemented in the context of the architecture and environment of FIGS. 1-3. Of course, however, the system 400 may be carried out in any desired environment. It should also be noted that the aforementioned definitions may apply during the present description.

As shown, a client 402 sends a request for a resource utilizing a proxy 404 to a server 406. The proxy 404 may optionally include any interception device, such as for example an intrusion detection system (IDS) and/or intrusion prevention system (IPS). In addition, the proxy 404 can be of any type, such as for example a transparent proxy. The request may optionally be sent to the server 406 utilizing a network. For example, the network may include any of the networks described with respect to FIG. 1. In addition, the client 402 and/or proxy 404 may include any of the devices described above with respect to FIGS. 1 and/or 2, but, of course, may include any type of device capable of sending and/or receiving a request.

The resource may include any type of resource capable of being received by the client 402. In one possible embodiment, the resource may include a file, an HTML page, and/or any other type of data. The proxy 404 may then forward the request to the server 406.

The server 406 may include any type of device capable of providing the requested resource to the client 402. In particular, the server 406 may respond to the client request by sending the requested resource to the client 402 utilizing the proxy 404. Optionally, the server 406 may respond by notifying the client 402 that it does not have the requested resource. Still yet, the server 406 may respond to the client 402 by way of the proxy 404.

The proxy 404 may optionally determine whether the server response includes shellcode which, in turn, could potentially be associated with undesirable computer code. Specifically, the proxy 404 may determine whether the response includes shellcode. The proxy 404 may then forward the response to the client 402 based on the determination.

Just by way of example, the proxy 404 may send an alert to the client if it is determined that the server contains shellcode. Optionally, the server response may also be quarantined, deleted and/or any other desired action may be performed. Of course, the proxy 404 may also forward the response to the client 402 if it is determined that the requested resource does not include shellcode.

Figure 5:
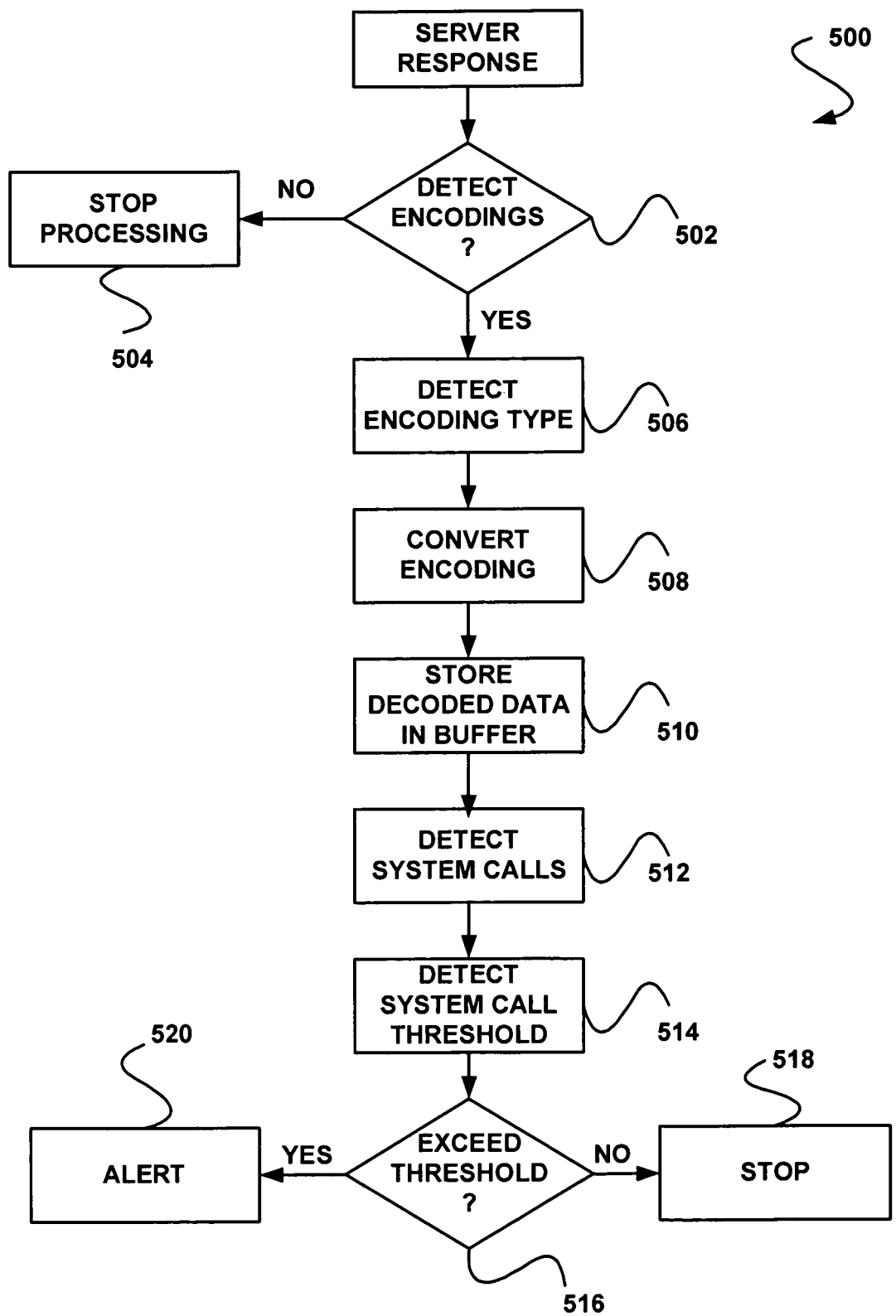
FIG. 5 shows a method for detecting potentially undesirable network traffic with respect to a requested resource, in accordance with still yet another embodiment.

FIG. 5 shows a method 500 for detecting potentially undesirable network traffic with respect to a requested resource, in accordance with still yet another embodiment. As an option, the method 500 may be implemented in the context of the architecture and environment of FIGS. 1-4. Of course, however, the method 500 may be carried out in any desired environment. It should also be noted that the aforementioned definitions may apply during the present description.

As shown in decision 502, it is determined whether encoded network traffic is detected within a server response. Specifically, such determination may include detecting any type of encoding within an HyperText Transfer Protocol (HTTP) stream associated with a server response. For example, the encoding may involve a situation where all of the network traffic associated with the server response is encoded. As another option, the encoding may involve only a portion of the network traffic associated with the server response.

If it is determined in decision 502 that the server response does not include encoded network traffic, processing of the server response (or at least security-related processing, etc.) is terminated, as shown in operation 504. Optionally, the server response may be forwarded to an intended recipient. For example, the server response may be forwarded to a client computer that requested the network traffic included in the server response.

If, however, it is determined in decision 502 that the server response does include encoded network traffic, the type of encoding may be detected. Note operation 506. In one embodiment, the type of encoding may be detected by identifying a predetermined character and/or sequence of characters within the encoded network traffic.

In an optional embodiment, the network traffic may be parsed in order to detect the type of encoding. Of course, however, any method of detecting an encoding scheme utilized to encode network traffic may be identified. Table 1 shows two exemplary encoding schemes that may be detected from a predetermined number of characters. Such encoding schemes are for illustration purposes only, and should not be viewed as limiting in any manner. It should also be noted that such encoding schemes may be implemented in various manners, and are not limited to the manners shown in Table 1. For example, the encoding schemes may be implemented according to a parsing technique utilized by an intended recipient of the network traffic.

TABLE 1

| |
| --- |
| UTF-8: %XX%YY |
| UTF-16: %uXXxx%uYYyy |

Just by way of example, with respect to an UTF-16 encoding scheme illustrated in Table 1, network traffic may be identified as including the UTF-16 encoding scheme if the sequence '%u' is identified within the network traffic. Once the type of encoding is detected in operation 506, the actual encoded portion of the network traffic may be identified (not shown). Such actual encoded portion of the network traffic may be identified in any desired manner. As an option, the actual encoded portion of the network traffic may be identified utilizing the parsed network traffic, as described above.

For instance, a sequence of characters following an encoding identifier may include the actual encoded portion of the network traffic. Thus, as in the examples in Table 1 and for illustration purposes only, the sequence of characters following the '%u' may include the actual UTF-16 encoded portion of the network traffic. In particular, in the example shown in Table 1, the 'XXxx' and 'YYyy' may be the actual UTF-16 encoded portion of the network traffic.

The encoded portions of the network traffic may then be converted, as shown in operation 508. In one embodiment, the encoded portions of the network traffic may be converted to associated decoded known values. Just by way of example, the encoded portions may be converted to equivalent hexadecimal values, and therefore a hexadecimal format. Of course, the encoded portions may be converted to any type of values.

In this way, characters within the encoded portions of the network traffic may be mapped to characters associated with shellcode. Table 2 illustrates just one example of encoded network traffic data in its encoded and converted forms. Again, Table 2 is just by way of illustration purposes only, and should not be construed as limiting in any manner.

TABLE 2

Encoded: %u4141%u4141%u4343%u4343%u4242
Hex Converted: \x41\x41\x41\x41\x43\x43\x43\x43\x42\x42

As an option, the encoded portions of the network traffic may be converted by individually converting each encoded character within the encoded portion of the network traffic. For example, in the example shown in Table 2, '%u4343' may be converted to '\x43\x43' prior to converting a subsequent sequence of characters within the same encoded portion of network traffic. In this way, encoded portions of network traffic may be converted while preventing evasions in the analysis of such network traffic.

Still yet, the converted network traffic may be stored into a buffer, as shown in operation 510. The buffer may include any type of memory capable of storing data associated with network traffic. To this end, the converted network traffic may be buffered. Furthermore, the converted network traffic may be stored in its original sequence, such that the sequence of data stored in the buffer is the same as the sequence of data within the network traffic. Specifically, the converted network traffic may be buffered in an order in which the network traffic is received.

As shown in operation 512, system calls within the stored network traffic may then be detected. In particular, predetermined instructions may be detected within the stored network traffic. For example, such predetermined instructions may be known to be associated with shellcode. Of course, the predetermined instructions may include the system calls, no operations and/or any other type of instructions capable of being associated with shellcode.

As an option, an anomaly based technique may be utilized to detect system calls. For example, known system calls may each be associated with a weight (e.g. a binary weight, etc.). As another option, each system call within the stored network traffic may be identified.

Further, each identified system call may be detected according to central processing unit (CPU) architectures associated with the system calls [e.g. x86, Scalable Processor Architecture (SPARC), Multi-Instruction Processing System (MIPS), Reduced-Instruction Set Computing (RISC), PowerPC, etc.]. In one embodiment, a detection routine utilized for detecting the system calls may be selected based on a CPU, operating system, etc. of an associated system. For instance, the associated system may include the system from which the network traffic is received. Thus, system calls associated with known shellcode may be detected based on an associated system. In this way, the buffer may be scanned for such system calls such that potential harmful system calls may be detected.

A system call threshold may also be identified, as shown in operation 514. The system call threshold may be any threshold associated with system calls. For example, the threshold may be associated with the weights applied to system calls, as described above. Of course, the threshold may also be associated with a number of system calls identified within the network traffic stored in the buffer.

The threshold may optionally be based on a type of application utilizing the network traffic detected in operation 502. In this way, the threshold may be customized for applications that utilize encoded network traffic extensively. Of course, the threshold may also be customized according to the type of network traffic that includes the encoding. Just by way of example, a low threshold may be utilized for HTTP network traffic that is encoded.

The system call threshold may then be utilized by comparing such threshold to the detected system calls of operation 512. Note operation 516. Thus, predetermined instructions detected in operation 512 may be counted and such number may be compared to at least one threshold.

In one embodiment, an anomaly detection engine may perform the comparison. If the detected system calls exceed the threshold, an alert may be generated, as shown in operation 520. Just by way of example, the alert may include a notification that encoded shellcode has been detected within the network traffic associated with the server response. If the detected system calls do not exceed the threshold, processing of the server response may be terminated, as shown in operation 518.

In this way, it may be determined whether a server response and/or any type of network traffic exceeds a threshold amount of potentially harmful system calls. Exceeding such threshold of system calls may be indicative of a situation where the network traffic includes shellcode. For example, such shellcode may be used to exploit vulnerabilities within a computer device receiving the network traffic.

Further, zero day exploits, malware and/or any other unwanted data may be detected and prevented by detecting such shellcode. Furthermore, in one embodiment, such shellcode may optionally be detected without the use of signatures identifying known unwanted data. Specifically, antivirus applications, firewalls, intrusion detection systems, intrusion prevention systems and/or any other type of content inspection product may be utilized to detect such shellcode.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by subnational groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by identifying shellcode in encoded network traffic, etc., which may be used to combat cyber-terrorism.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
identifying network traffic that is encoded, utilizing a processor;
determining a type of encoding associated with the network traffic;
converting the network traffic that is encoded;
determining whether the network traffic that is encoded includes shellcode;
counting predetermined instructions; and
determining whether a number of the predetermined instructions exceeds at least one threshold,
wherein the determination whether the network traffic includes the shellcode is conditionally performed based on a determination whether the network traffic comprises machine language instructions encoded as text,
wherein the at least one threshold is determined based on an application associated with the network traffic.

2. A method, comprising:
identifying network traffic that is encoded, utilizing a processor;
determining a type of encoding associated with the network traffic;
converting the network traffic that is encoded; and
determining whether the network traffic that is encoded includes shellcode,
wherein the determination whether the network traffic includes the shellcode is
conditionally performed based on a determination whether the network traffic comprises machine language instructions encoded as text, and
wherein the act of determining whether the network traffic that is encoded includes shellcode comprises:
determining whether the network traffic that is encoded includes shellcode without the use of signatures identifying known unwanted data.

3. A method, comprising:
identifying network traffic that is encoded, utilizing a processor;
determining a type of encoding associated with the network traffic;
converting the network traffic that is encoded; and
determining whether the network traffic that is encoded includes shellcode,
wherein the determination whether the network traffic includes the shellcode is conditionally performed based on a determination whether the network traffic comprises machine language instructions encoded as text, and
wherein the act of determining whether the network traffic that is encoded includes shellcode comprises:
detecting a number of predetermined instructions in the network traffic; and
determining whether the number of predetermined instructions exceeds a threshold,
wherein the threshold is based on an application utilizing the network traffic.

4. A method, comprising:
identifying network traffic that is encoded, utilizing a processor;
determining a type of encoding associated with the network traffic;
converting the network traffic that is encoded; and
determining whether the network traffic that is encoded includes shellcode,
wherein the determination whether the network traffic includes the shellcode is conditionally performed based on a determination whether the network traffic comprises machine language instructions encoded as text, and
wherein the act of determining whether the network traffic that is encoded includes shellcode comprises:
detecting a number of predetermined instructions in the network traffic; and
determining whether a number of predetermined instructions exceeds a threshold,
wherein the threshold is based on a type of the network traffic that is encoded.

5. A method, comprising:
identifying network traffic that is encoded, utilizing a processor;
determining a type of encoding associated with the network traffic;
converting the network traffic that is encoded; and
determining whether the network traffic that is encoded includes shellcode,
wherein the determination whether the network traffic includes the shellcode is conditionally performed based on a determination whether the network traffic comprises machine language instructions encoded as text, and
wherein the act of determining whether the network traffic that is encoded includes shellcode comprises:
detecting predetermined instructions within the network traffic, wherein each predetermined instruction is associated with a weight; and
determining whether the predetermined instructions within the network traffic exceed a threshold, wherein the threshold is associated with the weights of the predetermined instructions.

6. A computer program product embodied on a nontransitory computer readable medium, comprising:
computer code for identifying network traffic that is encoded;
computer code for determining a type of encoding associated with the network traffic;
computer code for converting the network traffic that is encoded; and
computer code for determining whether the network traffic that is encoded at least potentially includes shellcode,
wherein the computer program product is operable such that the determination whether the network traffic includes the shellcode is conditionally performed based on a determination whether the network traffic comprises machine language instructions encoded as text, and wherein the computer code for determining whether the network traffic that is encoded at least potentially includes shellcode comprises:

computer code for detecting a number of predetermined instructions in the network traffic; and computer code for determining whether the number of predetermined instructions exceeds a threshold, wherein the threshold is based on an application utilizing the network traffic.

7. A computer program product embodied on a non-transitory computer readable medium, comprising:

computer code for identifying network traffic that is encoded;

computer code for determining a type of encoding associated with the network traffic;

computer code for converting the network traffic that is encoded; and computer code for determining whether the network traffic that is encoded at least potentially includes shellcode, wherein the computer program product is operable such that the determination whether the network traffic includes the shellcode is conditionally performed based on a determination whether the network traffic comprises machine language instructions encoded as text, and wherein the computer code for determining whether the network traffic that is encoded at least potentially includes shellcode comprises:

computer code for detecting a number of predetermined instructions in the network traffic; and computer code for determining whether the number of predetermined instructions exceeds a threshold, wherein the threshold is based on a type of the network traffic that is encoded.

8. A computer program product embodied on a non-transitory computer readable medium, comprising:

computer code for identifying network traffic that is encoded;

computer code for determining a type of encoding associated with the network traffic;

computer code for converting the network traffic that is encoded; and computer code for determining whether the network traffic that is encoded at least potentially includes shellcode, wherein the computer program product is operable such that the determination whether the network traffic includes the shellcode is conditionally performed based on a determination whether the network traffic comprises machine language instructions encoded as text, and wherein the computer code for determining whether the network traffic that is encoded at least potentially includes shellcode comprises:

computer code for detecting predetermined instructions within the network traffic, wherein each predetermined instruction is associated with a weight; and computer code for determining whether the predetermined instructions within the network traffic exceed a threshold, wherein the threshold is associated with the weights of the predetermined instructions.

9. A system, comprising:

a client device for receiving encoded network traffic, comprising a processor; and a security application installed on the client device, the security application for determining a type of encoding associated with the network traffic, converting the network traffic that is encoded, and determining whether the encoded network traffic includes shellcode, wherein the security application is operable such that the determination whether the network traffic includes the shellcode is conditionally performed based on a determination whether the network traffic comprises machine language instructions encoded as text, and wherein the security application comprises instructions that when executed by the processor, cause the processor to perform actions comprising:

detecting a number of predetermined instructions in the network traffic; and determining whether the number of predetermined instructions exceeds a threshold, wherein the threshold is based on an application utilizing the network traffic.

10. A system, comprising:

a client device for receiving encoded network traffic, comprising a processor; and a security application installed on the client device, the security application for determining a type of encoding associated with the network traffic, converting the network traffic that is encoded, and determining whether the encoded network traffic includes shellcode, wherein the security application is operable such that the determination whether the network traffic includes the shellcode is conditionally performed based on a determination whether the network traffic comprises machine language instructions encoded as text, and wherein the security application comprises instructions that when executed by the processor, cause the processor to perform actions comprising:

detecting a number of predetermined instructions in the network traffic; and determining whether the number of predetermined instructions exceeds a threshold, wherein the threshold is based on a type of the network traffic that is encoded.

11. A system, comprising:

a client device for receiving encoded network traffic, comprising a processor; and a security application installed on the client device, the security application for determining a type of encoding associated with the network traffic, converting the network traffic that is encoded, and determining whether the encoded network traffic includes shellcode, wherein the security application is operable such that the determination whether the network traffic includes the shellcode is conditionally performed based on a determination whether the network traffic comprises machine language instructions encoded as text, and wherein the security application comprises instructions that when executed by the processor, cause the processor to perform actions comprising:

detecting predetermined instructions within the network traffic, wherein each predetermined instruction is associated with a weight; and determining whether the predetermined instructions within the network traffic exceed a threshold, wherein the threshold is associated with the weights of the predetermined instructions.

12. A system, comprising:

a client device for receiving encoded network traffic, comprising a processor; and a security application installed on the client device, the security application for determining a type of encoding associated with the network traffic, converting the network traffic that is encoded, and determining whether the encoded network traffic includes shellcode, wherein the security application is operable such that the determination whether the network traffic includes the shellcode is conditionally performed based on a determination whether the network traffic comprises machine language instructions encoded as text, and wherein the security application comprises:
   a detection routine, selected based on characteristics of the client device.

13. A method, comprising:

identifying network traffic that is encoded, utilizing a processor;

determining a type of encoding associated with the network traffic;

converting the network traffic that is encoded;

determining whether the network traffic that is encoded includes shellcode; and selecting a detection routine, wherein the determination whether the network traffic includes the shellcode is conditionally performed based on a determination whether the network traffic comprises machine language instructions encoded as text, wherein the act of determining whether the network traffic that is encoded includes shellcode is performed by the detection routine, and wherein the act of selecting a detection routine comprises:
   selecting a detection routine based on characteristics of a system from which the network traffic is received.

* * * * *